United States Patent
Kuwahara et al.

(10) Patent No.: US 9,488,270 B2
(45) Date of Patent: Nov. 8, 2016

(54) SLIP CONTROL DEVICE OF LOCK-UP CLUTCH

(71) Applicant: TOYOTA JIDOSHA KABUSHIKI KAISHA, Toyota-shi (JP)

(72) Inventors: Seiji Kuwahara, Susono (JP); Seiji Masunaga, Numazu (JP); Takayuki Ando, Sunto-gun (JP); Yuki Aratsu, Naka-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/978,742

(22) Filed: Dec. 22, 2015

(65) Prior Publication Data

US 2016/0208913 A1    Jul. 21, 2016

(30) Foreign Application Priority Data

Jan. 19, 2015 (JP) .................................. 2015-007883

(51) Int. Cl.
*F16H 61/14* (2006.01)

(52) U.S. Cl.
CPC ....... *F16H 61/143* (2013.01); *F16H 2061/145* (2013.01)

(58) Field of Classification Search
None
See application file for complete search history.

(56) References Cited

U.S. PATENT DOCUMENTS

| 6,132,336 A | 10/2000 | Adachi et al. |
| 7,346,442 B2 | 3/2008 | Higashimata et al. |
| 2005/0121277 A1* | 6/2005 | Segawa ................ F16H 61/143 192/3.3 |
| 2011/0239801 A1* | 10/2011 | Inagaki ................ B60K 6/387 74/473.1 |
| 2012/0143453 A1* | 6/2012 | Nagami ................ F16H 61/143 701/68 |
| 2014/0081541 A1* | 3/2014 | Yanakiev ............ F16H 61/0021 701/67 |

FOREIGN PATENT DOCUMENTS

| JP | 10-306870 | 11/1998 |
| JP | 11-82726 | 3/1999 |
| JP | 2005-351329 | 12/2005 |
| JP | 2014-13088 | 1/2014 |

\* cited by examiner

*Primary Examiner* — Edwin A Young
(74) *Attorney, Agent, or Firm* — Oblon, McClelland, Maier & Neustadt, L.L.P.

(57) ABSTRACT

A slip control device includes a control unit configured to: calculate a difference value between a target value and a current value or an estimated value of a difference in a rotational speed between an input shaft and an output shaft of a fluid type power transmitting device, or a difference value being a difference between a target value and a current value or an estimated value of a speed of an engine; calculate an inclination of torque capacity of the fluid type power transmitting device with respect to an input parameter at a current value of the input parameter having correlative relationship with the torque capacity of the fluid type power transmitting device; calculate torque capacity of a lock-up clutch by multiplying the inclination by the difference value; and control a slip amount of the lock-up clutch by using the calculated torque capacity.

4 Claims, 9 Drawing Sheets

SLIP CONTROL DEVICE OF LOCK-UP CLUTCH

CROSS-REFERENCE TO RELATED APPLICATION(S)

The present application claims priority to and incorporates by reference the entire contents of Japanese Patent Application No. 2015-007883, filed on Jan. 19, 2015.

BACKGROUND OF THE INVENTION

1. Field of the Invention

The present invention relates to a slip control device of a lock-up clutch.

2. Description of the Related Art

In general, a vehicle provided with a fluid type power transmitting device such as a torque converter and a fluid coupling which transmits output torque of an engine to a transmission is provided with a lock-up clutch for improving fuel efficiency by reducing a fluid loss of torque in the fluid type power transmitting device. The lock-up clutch is arranged in parallel to the fluid type power transmitting device to directly connect the engine to the transmission when fully engaged. However, when the engine is directly connected to the transmission by the lock-up clutch at a low vehicle speed, torque fluctuation of the engine is directly transmitted to the transmission, so that drivability is deteriorated. Therefore, in general, at the low vehicle speed, both improvement in fuel efficiency and inhibition of deterioration in the drivability are satisfied by performing slip control of the lock-up clutch to use the lock-up clutch while allowing the same to slip by a requisite minimum slip amount.

Torque capacity of a fluid type power transmitting device non-linearly changes according to an engine speed, a rotational speed of an output shaft of the fluid type power transmitting device (turbine speed), and a difference in rotational speed between an input shaft and the output shaft of the fluid type power transmitting device (slip speed). Therefore, it is necessary to take a non-linear characteristic of the fluid type power transmitting device into consideration for calculating torque capacity of a lock-up clutch (magnitude of torque transmitted by engagement of lock-up clutch) required for maintaining a slip amount of the lock-up clutch. In such a background, conventionally, the non-linear characteristic of the fluid type power transmitting device is identified by a high-order model and the non-linear characteristic of the fluid type power transmitting device is taken into consideration by using a high-order controller. However, operation to identify the high-order model and operation to design the high-order controller are complicated, so that it takes a lot of time and effort. A coefficient of a high-order filter included in the controller is not directly connected to behavior of an actual machine, so that it is difficult to intuitively comprehend the same, and tuning by using the actual machine is eventually difficult.

Meanwhile, in order to solve such a problem, Japanese Laid-open Patent Publication No. 2005-351329 suggests technology to switch a method of controlling the slip amount of the lock-up clutch for each operating range. Specifically, the technology disclosed in Japanese Laid-open Patent Publication No. 2005-351329 controls the slip amount of the lock-up clutch by open loop control based on a driving state of a vehicle in the operating range in which relationship between a torque capacity coefficient of a torque converter and a speed ratio is non-linear. On the other hand, in the operating range in which the relationship between the torque capacity coefficient of the torque converter and the speed ratio is linear, the technology disclosed in Japanese Laid-open Patent Publication No. 2005-351329 controls the slip amount of the lock-up clutch by feedback control based on a difference between a target slip amount and an actual slip amount. However, comprehensive tuning of the method of controlling for each of a plurality of operating ranges, so that the number of steps is enormous. The comprehensive tuning is not a realistic method when various pieces of operation by a driver, environmental variation, and individual variation are taken into consideration.

There is a need for a slip control device of the lock-up clutch capable of optimally controlling the slip amount of the lock-up clutch over an entire operating range by calculating the torque capacity of the lock-up clutch by a simple configuration without the need of a lot of cost.

SUMMARY OF THE INVENTION

It is an object of the present invention to at least partially solve the problems in the conventional technology.

A slip control device of this disclosure is adapted to be mounted on a vehicle including an engine, a transmission, a fluid type power transmitting device interposed between the engine and the transmission, and a lock-up clutch provided on the fluid type power transmitting device, is configured to control a difference in rotational speed between an input shaft and an output shaft of the fluid type power transmitting device by controlling a slip amount of the lock-up clutch, and includes a control unit configured to: calculate a difference value between a target value and a current value or an estimated value of the difference in the rotational speed between the input shaft and the output shaft of the fluid type power transmitting device, or a difference value between a target value and a current value or an estimated value of a speed of the engine; calculate an inclination of torque capacity of the fluid type power transmitting device with respect to an input parameter at a current value of the input parameter having correlative relationship with the torque capacity of the fluid type power transmitting device; calculate torque capacity of the lock-up clutch by multiplying the inclination by the difference value; and control the slip amount of the lock-up clutch by using the calculated torque capacity.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A slip control device of a lock-up clutch of the disclosure is hereinafter described with reference to the drawings.

Configuration of Vehicle

First, a configuration of a vehicle to which the slip control device of the lock-up clutch is applied is described with reference to FIG. 1.

Figure 1:
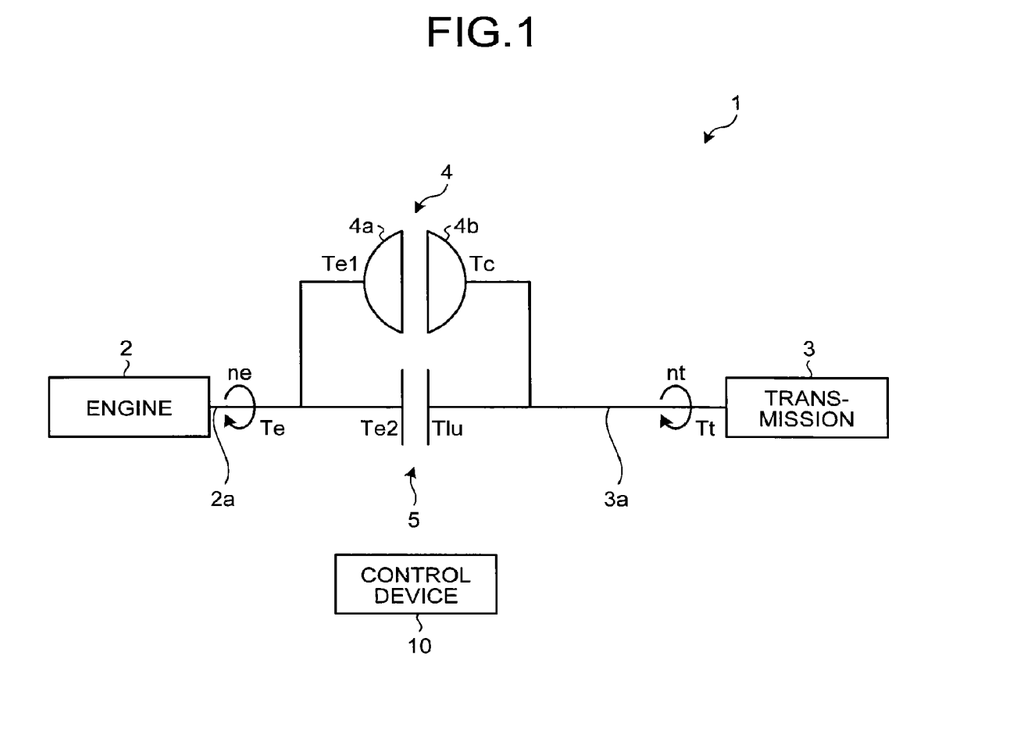
FIG. 1 is a schematic diagram illustrating a configuration of a vehicle to which a slip control device of a lock-up clutch is applied.

FIG. 1 is a schematic diagram illustrating the configuration of the vehicle to which the slip control device of the lock-up clutch according to one embodiment of the disclosure is applied. As illustrated in FIG. 1, a vehicle 1 to which the slip control device of the lock-up clutch is applied is provided with an engine 2, a transmission 3, a torque converter 4, and a lock-up clutch 5 as main components.

The engine 2 is an internal combustion engine such as a gasoline engine and a diesel engine which generates driving force by combustion of fuel injected into a cylinder, for example. Meanwhile, reference signs ne and Te in the drawing represent a speed of the engine 2 (hereinafter, engine speed) and output torque, respectively.

The transmission 3 changes a speed of output torque Tt which is a sum of output torque To of the torque converter 4 and output torque Tlu of the lock-up clutch 5 and thereafter transmits the same to a drive wheel not illustrated. Examples of the transmission 3 may include an automatic transmission (AT), a continuously variable transmission (CVT) and the like. Meanwhile, a reference sign nt in the drawing represents a turbine speed being a rotational speed of an input shaft of the transmission 3 (output shaft of torque converter 4).

The torque converter 4 provided with a pump impeller 4*a* corresponding to an input rotational member coupled to a clank shaft 2*a* of the engine 2 and a turbine runner 4*b* corresponding to an output rotational member coupled to the transmission 3 through a turbine shaft 3*a* is a fluid power transmitting device which transmits power through fluid. Although the torque converter 4 is arranged between the engine 2 and the transmission 3 in this embodiment, it is also possible to arrange a fluid type power transmitting device such as a fluid coupling in place of the torque converter 4. Meanwhile, a reference sign Te1 in the drawing represents input torque of the torque converter 4.

The lock-up clutch 5 mechanically directly connects an input side and an output side of the torque converter 4 to each other by full engagement thereof to disable a fluid power transmitting function by the pump impeller 4*a* and the turbine runner 4*b* of the torque converter 4. The lock-up clutch 5 is configured such that an engaging state thereof is controlled among a disengaged state, a slip-engaged state (semi-engaged state), and a fully-engaged state by control by a control device 10. Meanwhile, a reference sign Te2 in the drawing represents input torque of the lock-up clutch 5.

Concept of Invention

Figure 2:
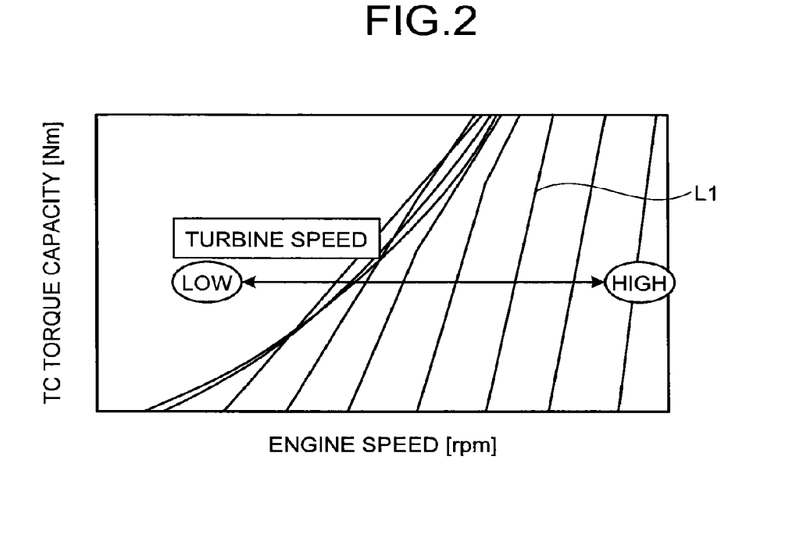
FIG. 2 is a conceptual diagram illustrating change in relationship between an engine speed and torque capacity of a torque converter with change in turbine speed.
Figure 3:
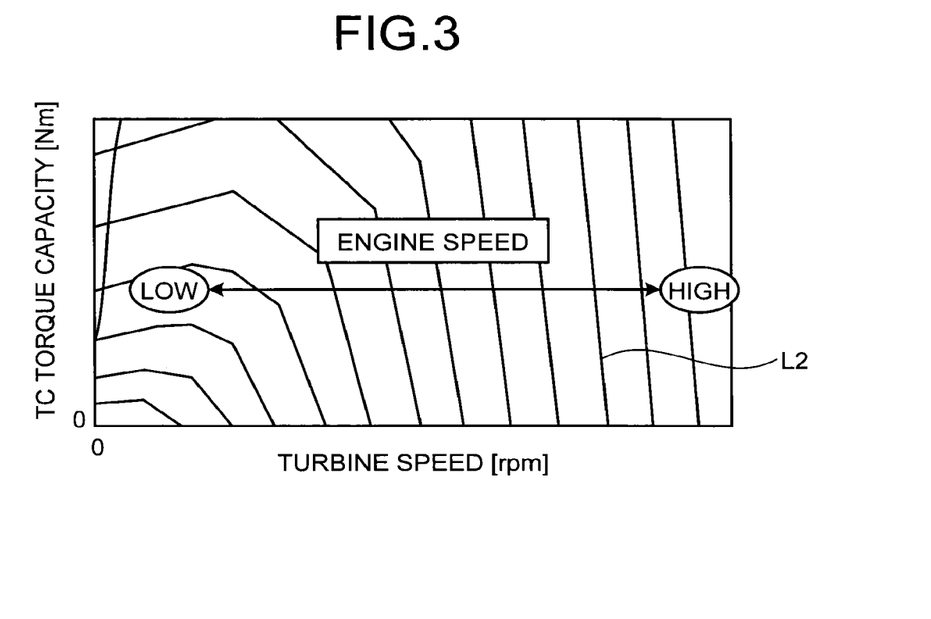
FIG. 3 is a conceptual diagram illustrating change in relationship between the turbine speed and the torque capacity of the torque converter with change in the engine speed.
Figure 4:
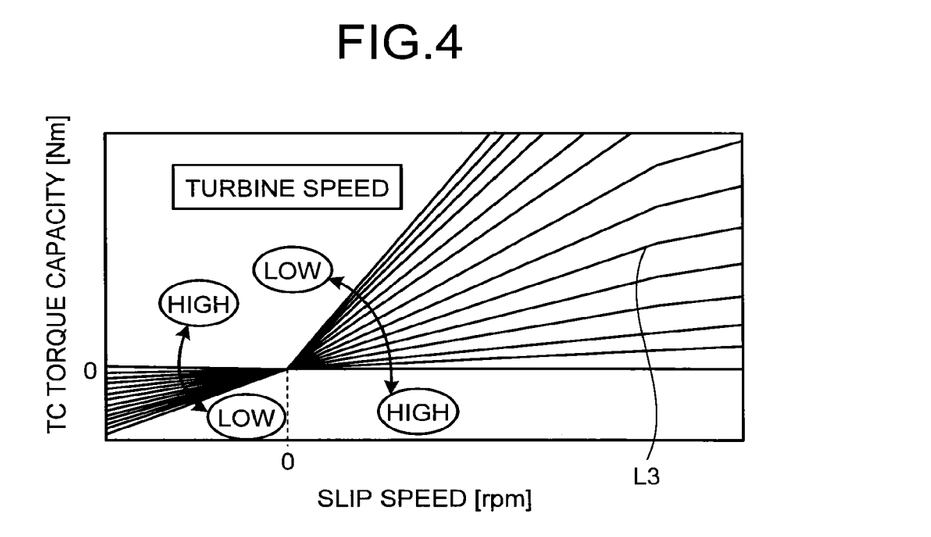
FIG. 4 is a conceptual diagram illustrating change in relationship between a slip speed and the torque capacity of the torque converter with the change in the turbine speed.
Figure 5A:
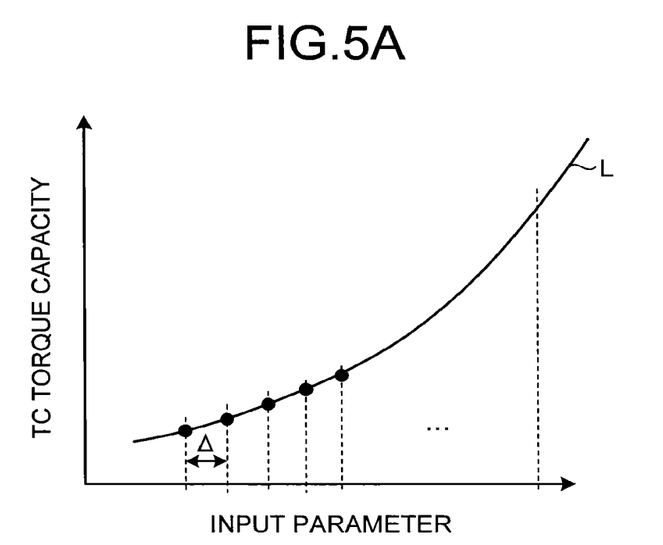
FIGS. 5A and 5B are schematic diagrams for illustrating a concept of the disclosure.
Figure 5B:
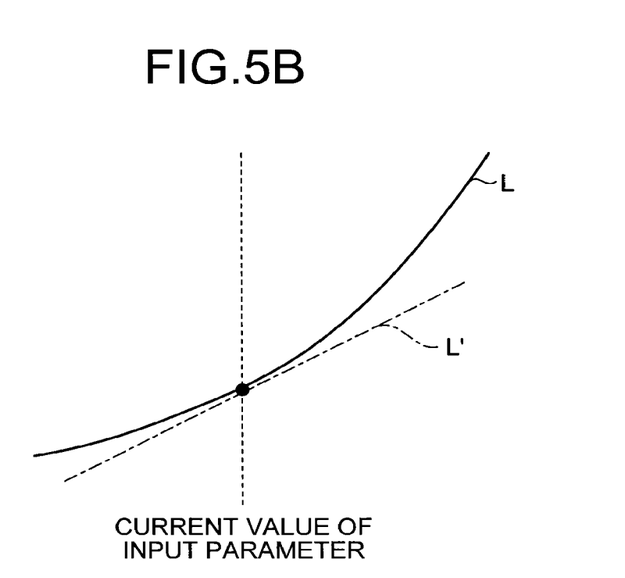
Figure 6:
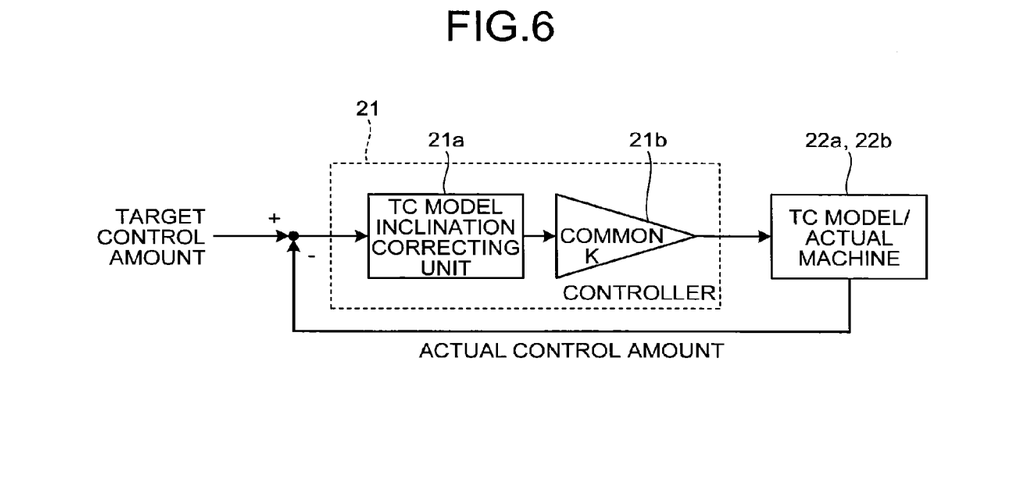
FIG. 6 is a block diagram illustrating a configuration of a controller in the disclosure.

Next, a concept of the disclosure is described with reference to FIGS. 2 to 6. FIG. 2 is a conceptual diagram illustrating change in relationship between the engine speed and torque capacity of the torque converter 4 with change in the turbine speed. FIG. 3 is a conceptual diagram illustrating change in relationship between the turbine speed and the torque capacity of the torque converter 4 with change in the engine speed. FIG. 4 is a conceptual diagram illustrating change in relationship between a slip speed and the torque capacity of the torque converter 4 with the change in the turbine speed. FIGS. 5A and 5B are schematic diagrams for illustrating the concept of the disclosure. FIG. 6 is a block diagram illustrating a configuration of a controller of the disclosure.

As illustrated in FIG. 2, a characteristic line L1 indicating the relationship between the engine speed and the torque capacity of the torque converter 4 (hereinafter, represented as TC torque capacity) non-linearly changes with the change in the turbine speed. Similarly, as illustrated in FIG. 3, a characteristic line L2 indicating the relationship between the turbine speed and the TC torque capacity non-linearly changes with the change in the engine speed. Similarly, as illustrated in FIG. 4, a characteristic line L3 indicating the relationship between the slip speed being a difference between the engine speed and the turbine speed (difference in rotational speed between input shaft and output shaft of torque converter 4) and the TC torque capacity non-linearly changes with the change in the turbine speed.

In this manner, the TC torque capacity non-linearly changes according to the engine speed, the turbine speed, and the slip speed. Therefore, it is required to identify the TC torque capacity by a high-order model for calculating torque capacity of the lock-up clutch 5 required for maintaining a slip amount of the lock-up clutch 5. However, operation to identify the high-order model is complicated, so that it takes a lot of time and effort.

Therefore, in the disclosure, the characteristic line L (L1 to L3) indicating the relationship between an input parameter (engine speed, turbine speed, and slip speed) having correlative relationship with the slip amount of the lock-up clutch 5 and the TC torque capacity is divided into a plurality of minute sections L as illustrated in FIG. 5A, and the characteristic line L in each minute section L is approximated by a straight line, then the characteristic line L is represented by a plurality of equations of straight lines having different inclinations. More specifically, as illustrated in FIG. 5B, the control device 10 partially differentiates the characteristic line L by the input parameter, thereby calculating an inclination of a tangential line L' of the characteristic line L at a current value of the input parameter.

In such a point of view, when the TC torque capacity is described as a function F(ne,nt) of the engine speed ne and the turbine speed nt, the TC torque capacity is represented by following equation (1). Herein, a1 and a2 in equation (1) represent the inclination of the characteristic line L1 indicating the relationship between the engine speed and the TC torque capacity at a current value $ne_0$ of the engine speed ne and the inclination of the characteristic line L2 indicating the relationship between the turbine speed and the TC torque capacity at a current value $nt_0$ of the turbine speed nt, respectively. Also, b1 represents an arbitrary constant.

$$F(ne,nt)=a1(ne-ne_0)+a2\cdot(nt-nt_0)+b1 \qquad (1)$$

Similarly, if the TC torque capacity is described as a function F(nslp,nt) of the slip speed nslp and the turbine speed nt, the TC torque capacity is represented by following equation (2). Herein, a3 and a4 in equation (2) represent the inclination of the characteristic line L3 indicating the relationship between the slip speed and the TC torque capacity at a current value $nslp_0$ of the slip speed nslp and the inclination of the characteristic line L2 indicating the relationship between the turbine speed and the TC torque capacity at the current value $nt_0$ of the turbine speed nt, respectively. Also, b2 represents an arbitrary constant.

$$F(nslp,nt)=a3\cdot(nslp-nslp_0)+a4\cdot(nt-nt_0)+b2 \qquad (2)$$

Then, the control device 10 calculates a value obtained by adding inertia I of the engine 2 and the torque converter 4 to an integral value of a value obtained by multiplying a difference between a target value (target control amount) and a current value or an estimated value (actual control amount) of the control amount (slip speed or engine speed) of the torque converter 4 by the calculated inclination of the characteristic line L and multiplying the same by a control gain as the torque capacity of the lock-up clutch 5. The control device 10 controls the slip amount of the lock-up clutch 5 based on the calculated torque capacity.

According to this, a fluctuation component of the inclination of the characteristic line L inherent in the actual control amount of the torque converter 4 is balanced out, so that a response characteristic of the actual control amount to change in the target control amount of the torque converter 4 is not affected by fluctuation of the inclination of the characteristic line L (non-linear characteristic). As a result, the control gain becomes equally sensitive to the actual control amount over an entire operating range, so that it becomes possible to calculate the torque capacity of the lock-up clutch 5 over the entire operating range by using a common control gain.

FIG. 6 is a schematic diagram illustrating the configuration of the controller of the disclosure constructed based on the above-described concept. As illustrated in FIG. 6, a controller 21 of the disclosure constructed based on the above-described concept is provided with a TC model inclination correcting unit 21a and a gain multiplying unit 21b.

The TC model inclination correcting unit 21a calculates an integral value of a value obtained by multiplying the inclination of the characteristic line L at the current value of the input parameter by a difference value between the actual control amount output from a TC model 22a or an actual machine 22b of the torque converter 4 and the target control amount and adds the inertia of the engine 2 and the torque converter 4 to the integral value to output. It is possible to obtain the inclination of the characteristic line L at the current value of the input parameter by reading the inclination corresponding to the current value of the input parameter from a table indicating the inclination of the characteristic line L for each value of the input parameter stored in advance, for example.

The gain multiplying unit 21b outputs a value obtained by multiplying a common control gain K by the value output from the TC model inclination correcting unit 21a as the torque capacity of the lock-up clutch 5. The control device 10 hereinafter controls the slip amount of the lock-up clutch 5 based on the calculated torque capacity.

As is clear from the description above, in the disclosure, the torque capacity of the lock-up clutch 5 is calculated not by taking the non-linear characteristic of the torque converter 4 into consideration by constructing the high-order model but by converting the non-linear characteristic of the torque converter 4 to a linear characteristic, so that it is possible to optimally control the slip amount of the lock-up clutch 5 over the entire operating range by calculating the torque capacity of the lock-up clutch 5 by a simple configuration without the need of a lot of cost.

Meanwhile, it is also possible to control only in the operating range in which the torque capacity of the torque converter 4 non-linearly changes with respect to the input parameter such as the operating range in which the turbine speed is low in place of executing the above-described control over the entire operating range.

Embodiment

Next, a slip control device of a lock-up clutch according to the embodiment of the disclosure conceived of based on the above-described concept of the disclosure is described with reference to FIGS. 7 to 11.

Figure 7:
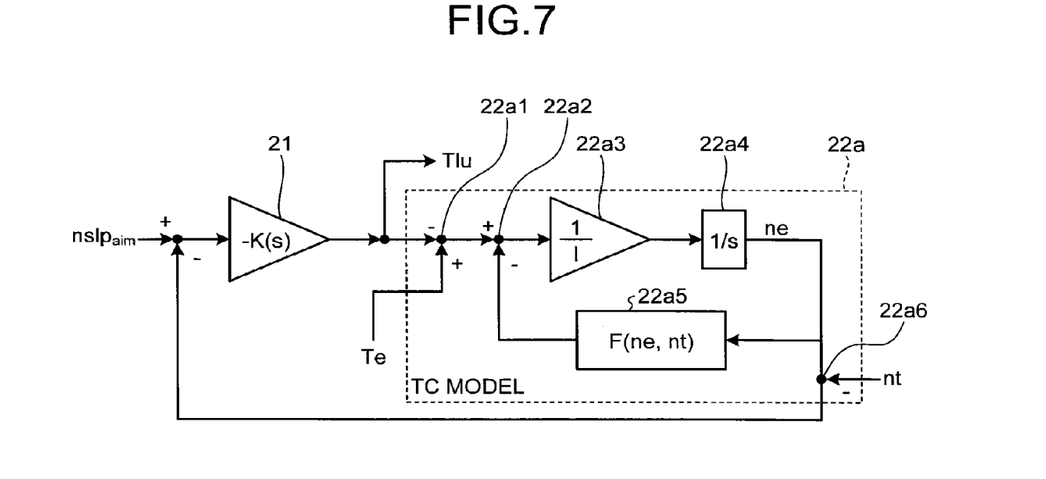
FIG. 7 is a schematic diagram illustrating a configuration of the slip control device of the lock-up clutch.

FIG. 7 is a schematic diagram illustrating a configuration of the slip control device of the lock-up clutch according to the embodiment of the disclosure. As illustrated in FIG. 7, the slip control device of the lock-up clutch according to the embodiment of the disclosure is provided with a controller 21. The controller 21 calculates torque capacity Tlu of a lock-up clutch 5 by using a difference between an estimated value of a slip speed of a torque converter 4 (hereinafter, estimated slip speed) output from a TC model 22a and a target value thereof (hereinafter, target slip speed) $nslp_{aim}$. The controller 21 outputs the calculated torque capacity Tlu of the lock-up clutch 5 to the TC model 22a and controls a slip amount of the lock-up clutch 5 based on the calculated torque capacity Tlu of the lock-up clutch 5.

Meanwhile, although the torque capacity Tlu of the lock-up clutch 5 is calculated based on the difference between the estimated slip speed and the target slip speed $nslp_{aim}$ in this embodiment, it is also possible to calculate the torque capacity Tlu of the lock-up clutch 5 based on a difference between an actual engine speed and a target engine speed $ne_{aim}$.

Herein, the TC model 22a is provided with subtracters 22a1 and 22a2, a multiplier 22a3, an integrator 22a4, an arithmetic unit 22a5, and a subtracter 22a6.

The subtracter 22a1 calculates a difference value between the torque capacity of the lock-up clutch 5 output from the controller 21 and output torque of an engine 2 and outputs the calculated difference value to the subtracter 22a2.

The subtracter 22a2 calculates a difference value between the difference value output from the subtracter 22a1 and torque capacity of the torque converter 4 output from the arithmetic unit 22a5 and outputs the calculated difference value to the multiplier 22a3.

The multiplier 22a3 multiplies a reciprocal of inertia I of the engine 2 and the torque converter 4 by the difference value output from the subtracter 22a2 and outputs the multiplied value to the integrator 22a4.

The integrator 22a4 calculates an integral value of the multiplied value output from the multiplier 22a3 and outputs the calculated integral value to the arithmetic unit 22a5 and the subtracter 22a6 as an estimated value of the engine speed.

The arithmetic unit 22a5 substitutes the estimated value of the engine speed output from the integrator 22a4 into a function F(ne,nt) representing the torque capacity of the torque converter 4 to calculate the torque capacity of the torque converter 4. The arithmetic unit 22a5 outputs the calculated torque capacity to the subtracter 22a2.

The subtracter 22a6 calculates a difference value between the engine speed output from the integrator 22a4 and a turbine speed and outputs the calculated difference value to a side of the controller 21 as the estimated slip speed.

Meanwhile, although the estimated slip speed output from the TC model 22a is used in control such that it is possible to perform feed forward control by calculating the torque capacity of the torque converter 4 without consideration of delay in response and variation in response of an actual machine of the torque converter 4 in this embodiment, it is also possible to replace the TC model 22a with an actual machine 22b of the torque converter 4 to use a current value of the slip speed obtained from the actual machine 22b.

Figure 8:
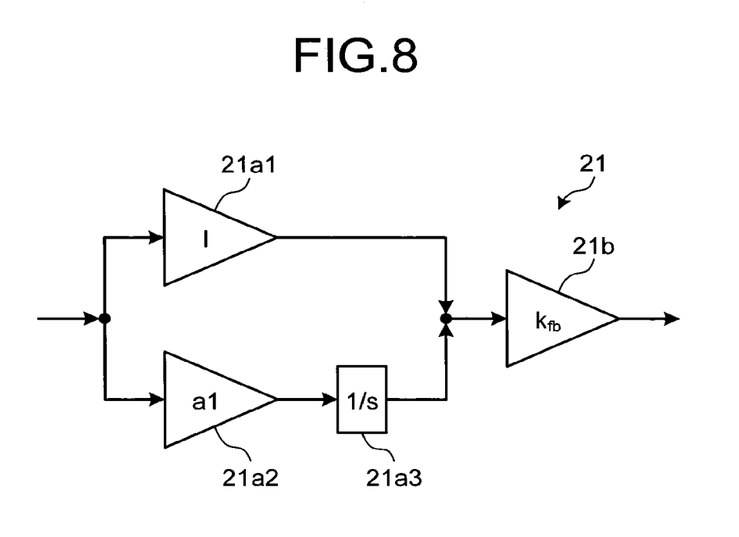
FIG. 8 is a schematic diagram illustrating a configuration of a controller illustrated in FIG. 7.

FIG. 8 is a schematic diagram illustrating a configuration of the controller illustrated in FIG. 7. As illustrated in FIG. 8, the controller 21 is provided with multipliers 21a1 and 21a2, an integrator 21a3, and a gain multiplying unit 21b.

The multiplier 21a1 multiplies the inertia I of the engine 2 and the torque converter 4 by the difference value between the estimated slip speed and the target slip speed $nslp_{aim}$. The multiplier 21a1 outputs the multiplied value to the gain multiplying unit 21b.

The multiplier 21a2 multiplies an inclination a1 of a characteristic line L1 indicating relationship between the engine speed and the torque capacity of the torque converter 4 at a current engine speed by the difference value between the estimated slip speed and the target slip speed $nslp_{aim}$. The multiplier 21a2 outputs the multiplied value to the integrator 21a3.

The integrator 21a3 calculates an integral value of the multiplied value of the multiplier 21a2 and outputs the calculated integral value to the gain multiplying unit 21b.

The gain multiplying unit 21b calculates a value obtained by multiplying a feedback gain $k_{fb}$ by a sum of the multiplied value output from the multiplier 21a1 and the integral value output from the integrator 21a3 as the torque capacity Tlu of the lock-up clutch 5. The gain multiplying unit 21b outputs the calculated torque capacity Tlu of the lock-up clutch 5 to the TC model 22a and controls the slip amount of the lock-up clutch 5 based on the calculated torque capacity Tlu of the lock-up clutch 5.

Next, a reason why a response characteristic of an engine speed ne to change in the target slip speed $nslp_{aim}$ is not affected by fluctuation of the inclination of the characteristic line L1 in the controller 21 configured in this manner is described with reference to equations.

If the controller 21 is represented by K(s), the torque capacity Tlu of the lock-up clutch 5 output from the controller 21 is represented by following equation (3). Also, K(s) is represented by following equation (4). Meanwhile, in equation (3), $nslp_{aim}$, ne, and nt represent the target slip speed, the engine speed, and the turbine speed, respectively. In equation (4), $k_{fb}$, I, and a1 represent the feedback gain, the inertia of the engine 2 and the torque converter 4, and the inclination of the characteristic line L1 indicating the relationship between the engine speed and the torque capacity of the torque converter 4 at the estimated value of the current engine speed.

$$Tlu = -K(s) \cdot (nslp_{aim} - (ne - nt)) \tag{3}$$

$$K(s) = k_{fb}(Is + a1) \cdot \frac{1}{s} \tag{4}$$

In contrast, the estimated value of the engine speed output from the TC model 22a is represented by following equation (5). Meanwhile, in equation (5), Te and F(ne,nt) represent the output torque of the engine 2 and a function representing the torque capacity of the torque converter 4 represented by equation (1), respectively.

$$ne = \frac{1}{Is}(Te - F(ne, nt) - Tlu) \tag{5}$$

Therefore, it is possible to obtain following equation (6) by substituting equation (3) into Tlu of equation (5).

$$ne = \frac{1}{Is}(Te - F(ne, nt) + K(s) \cdot (nslp_{aim} - ne + nt)) \tag{6}$$

Next, following equation (7) is obtained by multiplying Is by both sides of equation (6) and following equation (8) is obtained by substituting equation (4) into K(s) in equation (7).

$$Is \cdot ne = Te - F(ne, nt) + K(s) \cdot (nslp_{aim} - ne + nt) \tag{7}$$

$$Is \cdot ne = Te - F(ne, nt) + k_{fb}\left(I + \frac{a1}{s}\right)(nslp_{aim} - ne + nt) \tag{8}$$

Next, following equation (9) is obtained by substituting equation (1) into F(ne,nt) in equation (8), and equation (12) is obtained by arranging equation (9) in order of equations (10) and (11) and solving equation (11) in terms of the estimated value of the engine speed ne.

$$Is \cdot ne = Te - (a1 \cdot ne + a2 \cdot nt - a1 \cdot ne_0 - a2 \cdot nt_0 + b1) + \tag{9}$$
$$k_{fb}\left(I + \frac{a1}{s}\right) \cdot (nslp_{aim} - ne + nt)$$

$$\left(Is + k_{fb}\left(I + \frac{a1}{s}\right) + a1\right)ne = Te + k_{fb}\left(I + \frac{a1}{s}\right)nslp_{aim} + \tag{10}$$
$$\left(-a2 + k_{fb}\left(I + \frac{a1}{s}\right)\right) \cdot nt + a1 \cdot ne_0 + a2 \cdot nt_0 - b1$$

$$(s + k_{fb})\left(I + \frac{a1}{s}\right) \cdot ne = \tag{11}$$
$$Te + k_{fb}\left(I + \frac{a1}{s}\right) \cdot (nslp_{aim} + nt) - a2 \cdot nt + a1 \cdot ne_0 + a2 \cdot nt_0 - b1$$

$$ne = \frac{k_{fb}}{s + k_{fb}} \cdot (nslp_{aim} + nt) + \tag{12}$$
$$\frac{1}{(s + k_{fb})\left(I + \frac{a1}{s}\right)}(Te - a_2 \cdot nt + a1 \cdot ne_0 + a2 \cdot nt_0 - b1)$$

A first term of a right side of equation (12) indicates that the estimated value of the engine speed ne follows the target slip speed $nslp_{aim}$ at a constant rate $k_{fb}/(s+k_{fb})$. That is to say, the response characteristic of the engine speed ne to the change in the target slip speed $nslp_{aim}$ is not affected by the fluctuation of the inclination a1 of the characteristic line L1. According to this, the controller 21 illustrated in FIGS. 7 and 8 may calculate the torque capacity Tlu of the lock-up clutch 5 by a common feedback gain $k_{fb}$ without an effect of the torque capacity of the torque converter 4 which non-linearly changes. As a result, it is possible to optimally control the slip amount of the lock-up clutch 5 over an entire operating range by calculating the torque capacity Tlu of the lock-up clutch 5 by a simple configuration without the need of a lot of cost.

First Variation

Although the above-described embodiment is control to allow an estimated value of an engine speed ne to follow a target slip speed $nslp_{aim}$, it is also possible to calculate torque capacity Tlu of a lock-up clutch 5 by a common feedback gain $k_{fb}$ without an effect of torque capacity of a torque converter 4 which non-linearly changes also in a case in which an estimated value of a slip speed nslp is allowed to follow the target slip speed $nslp_{aim}$. Control based on the estimated value of the slip speed nslp is hereinafter described.

The estimated value of the slip speed nslp is represented by following equation (13) by using the estimated value of the engine speed ne output from a TC model 22a represented by equation (5).

$$nslp = \frac{1}{Is}(Te - F(ne, nt) - Tlu) - nt \quad (13)$$

Equation (14) is obtained by substituting equation (3) into equation (13) and equation (15) is obtained by multiplying Is by both sides of equation (14).

$$nslp = \frac{1}{Is}(Te - F(ne, nt) + K(s) \cdot (nslp_{aim} - ne + nt)) - nt \quad (14)$$

$$Is \cdot nslp = Te - F(ne, nt) + K(s) \cdot (nslp_{aim} - ne + nt) - Is \cdot nt \quad (15)$$

Herein, when an inclination of a characteristic line L3 indicating relationship between the slip speed and the TC torque capacity at a current value $nslp_0$ of the slip speed nslp is represented by a3 (refer to equation (2)), K(s) representing a controller 21 is represented by following equation (16).

$$K(s) = k_{fb}(Is + a3)\frac{1}{s} \quad (16)$$

Therefore, equation (17) is obtained by substituting equation (16) into equation (15) and equation (18) is obtained by substituting equation (2) into equation (17).

$$Is \cdot nslp = Te - F(ne, nt) + k_{fb}\left(I + \frac{a3}{s}\right)(nslp_{aim} - ne + nt) - Is \cdot nt \quad (17)$$

$$Is \cdot nslp = Te - (a3 \cdot nslp + a4 \cdot nt - a3 \cdot nslp_0 - a4 \cdot nt_0 + b2) + \\ k_{fb}\left(I + \frac{a3}{s}\right) \cdot (nslp_{aim} - nslp) - Is \cdot nt \quad (18)$$

Equation (22) is obtained by arranging equation (18) in order of equations (19), (20), and (21) and solving equation (21) in terms of the estimated value of the slip speed nslp.

$$Is \cdot nslp = Te - (a3 \cdot (nslp + nt) + a4 \cdot nt - a3 \cdot nslp_0 - a4 \cdot nt_0 + b2) + \\ k_{fb}\left(I + \frac{a3}{s}\right) \cdot (nslp_{aim} - nslp) - Is \cdot nt \quad (19)$$

$$\left(Is + k_{fb}\left(I + \frac{a3}{s}\right) + a3\right) \cdot nslp = Te + k_{fb}\left(I + \frac{a3}{s}\right)nslp_{aim} - \\ \left(Is + a4 - k_{fb}\left(I + \frac{a3}{s}\right)\right) \cdot nt + a3 \cdot nslp_0 + a4 \cdot nt_0 - b2 \quad (20)$$

$$(s + k_{fb})\left(I + \frac{a3}{s}\right) \cdot nslp = Te + k_{fb}\left(I + \frac{a3}{s}\right) \cdot nslp_{aim} - \\ \left(Is + a4 - k_{fb}\left(I + \frac{a3}{s}\right)\right) \cdot nt + a3 \cdot nslp_0 + a4 \cdot nt_0 - b2 \quad (21)$$

$$nslp = \frac{k_{fb}}{s + k_{fb}} \cdot nslp_{aim} - \left(\frac{Is + a4}{(s + k_{fb})\left(I + \frac{a3}{s}\right)} - \frac{k_{fb}}{s + k_{fb}}\right) \cdot nt + \\ \frac{1}{(s + k_{fb})\left(I + \frac{a3}{s}\right)}(Te + a3 \cdot ne_0 + a4 \cdot nt_0 - b2) \quad (22)$$

A first term of a right side of equation (22) indicates that the estimated value of the slip speed nslp follows the target slip speed $nslp_{aim}$ at a constant rate $k_{fb}/(s+k_{fb})$. That is to say, a response characteristic of the estimated value of the slip speed nslp to change in the target slip speed $nslp_{aim}$ is not affected by fluctuation of the inclination a3 of the characteristic line L3. According to this, according to this variation, it is possible to calculate the torque capacity Tlu of the lock-up clutch 5 by the common feedback gain $k_{fb}$ without the effect of the torque capacity of the torque converter 4 which non-linearly changes. As a result, it is possible to optimally control the slip amount of the lock-up clutch 5 over an entire operating range by calculating the torque capacity Tlu of the lock-up clutch 5 by a simple configuration without the need of a lot of cost.

Second Variation

Figure 9:
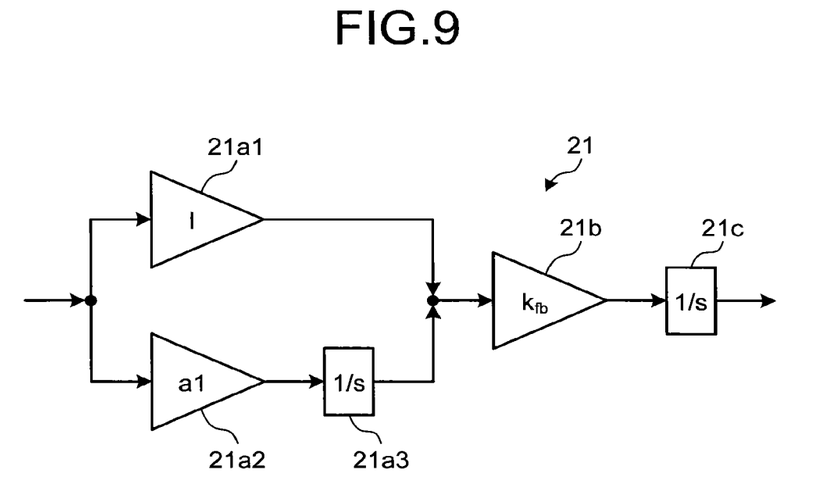
FIG. 9 is a schematic diagram illustrating a configuration of a variation of the controller illustrated in FIG. 8.

In this variation, an integrator 21c is arranged on an output side of a gain multiplying unit 21b as illustrated in FIG. 9. Hereinafter, a reason why torque capacity Tlu of a lock-up clutch 5 may be calculated by a common feedback gain $k_{fb}$ without an effect of torque capacity of a torque converter 4 which non-linearly changes also in a configuration illustrated in FIG. 9 is described.

In the configuration illustrated in FIG. 9, a controller K(s) is represented by following equation (23). Therefore, equation (8) described in the above-described embodiment is represented by following equation (24).

$$K(s) = k_{fb}(Is + a1) \cdot \frac{1}{s^2} \quad (23)$$

$$Is \cdot ne = Te - F(ne, nt) + k_{fb}\left(I + \frac{a1}{s}\right) \cdot \frac{1}{s} \cdot (nslp_{aim} - ne + nt) \quad (24)$$

Equation (25) is obtained by substituting equation (1) into equation (24) and equation (28) is obtained by arranging equation (25) in order of equations (26) and (27) and solving in terms of an estimated value of an engine speed ne.

$$Is \cdot ne = Te - (a1 \cdot ne + a2 \cdot nt - a1 \cdot ne_0 - a2 \cdot nt_0 + b1) + \\ k_{fb}\left(I + \frac{a1}{s}\right) \cdot \frac{1}{s} \cdot (nslp_{aim} - ne + nt) \quad (25)$$

-continued $$\left(Is + k_{fb}\left(1 + \frac{a1}{s}\right) \cdot \frac{1}{s} + a1\right) \cdot ne = Te + k_{fb}\left(1 + \frac{a1}{s}\right) \cdot \frac{1}{s} \cdot nslp_{aim} + \quad (26)$$

$$\left(-a2 + k_{fb}\left(1 + \frac{a1}{s}\right) \cdot \frac{1}{s}\right) \cdot nt + a1 \cdot ne_0 + a2 \cdot nt_0 - b1$$

$$\left(s + k_{fb} \cdot \frac{1}{s}\right)\left(1 + \frac{a1}{s}\right) \cdot ne = \quad (27)$$

$$Te + k_{fb}\left(1 + \frac{a1}{s}\right) \cdot \frac{1}{s} \cdot (nslp_{aim} + nt) - a2 \cdot nt + a1 \cdot ne_0 + a2 \cdot nt - b1$$

$$ne = \frac{k_{fb}}{s + k_{fb} \cdot \frac{1}{s}} \cdot (nslp_{aim} + nt) + \frac{1}{\left(s + k_{fb} \cdot \frac{1}{s}\right)\left(1 + \frac{a1}{s}\right)} \quad (28)$$

$$(Te - a2 \cdot nt + a1 \cdot ne_0 + a2 \cdot nt_0 - b1)$$

$$= \frac{sk_{fb}}{s^2 + k_{fb}}(nslp_{aim} + nt) + \frac{1}{\left(s + k_{fb} \cdot \frac{1}{s}\right)\left(1 + \frac{a1}{s}\right)}$$

$$(Te - a2 \cdot nt + a1 \cdot ne_0 + a2 \cdot nt_0 - b1)$$

A first term of a right side of equation (28) indicates that the estimated value of the engine speed ne follows a target slip speed $nslp_{aim}$ at a constant rate $k_{fb}/(s+k_{fb})$. That is to say, the response characteristic of the engine speed ne to the change in the target slip speed $nslp_{aim}$ is not affected by the fluctuation of the inclination a1 of the characteristic line L1. According to this, in this variation also, it is possible to calculate the torque capacity Tlu of the lock-up clutch 5 by the common gain $k_{fb}$ without the effect of the torque capacity which non-linearly changes. As a result, it is possible to optimally control the slip amount of the lock-up clutch 5 over an entire operating range by calculating the torque capacity Tlu of the lock-up clutch 5 by a simple configuration without the need of a lot of cost.

Third Variation

Figure 10:
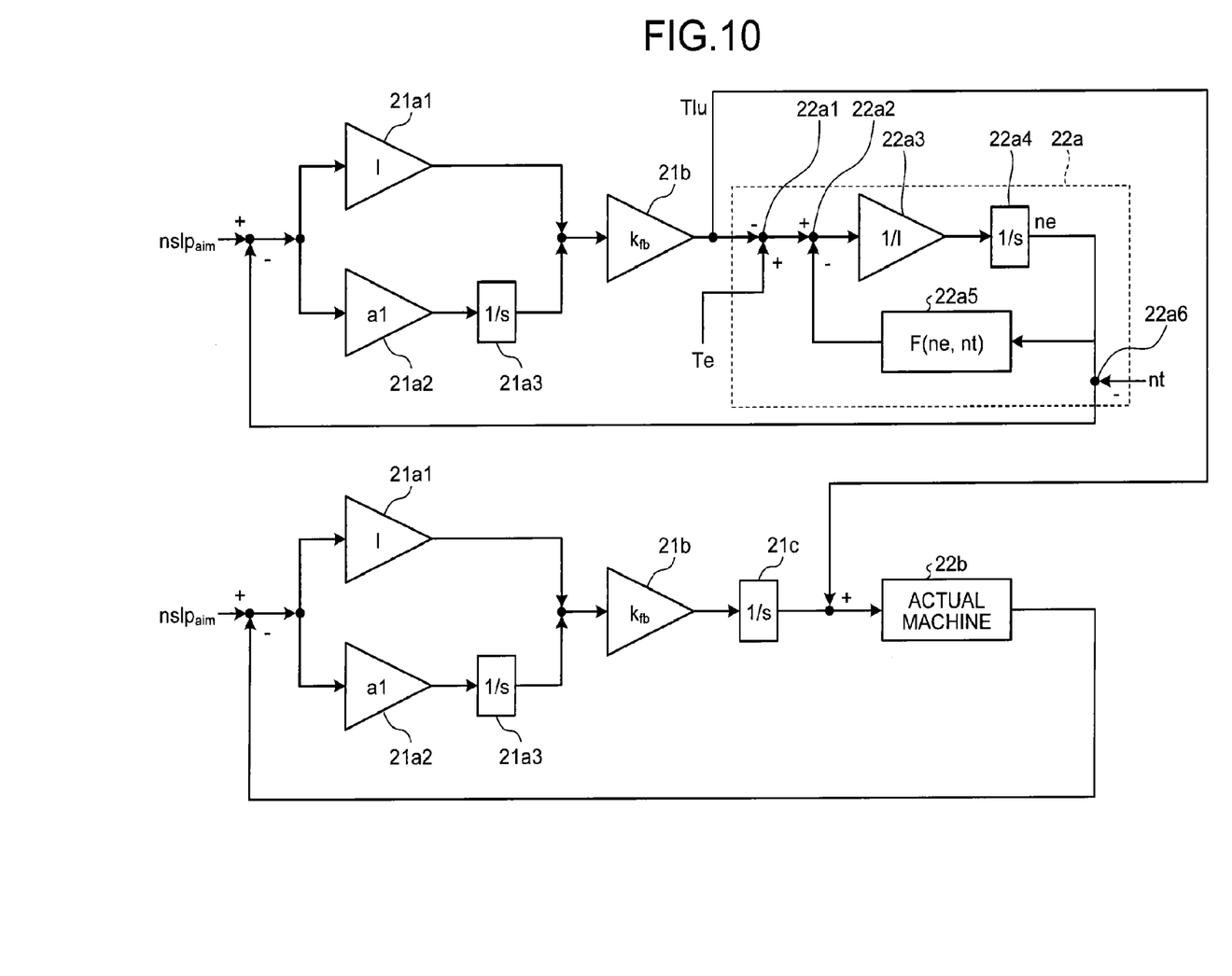
FIG. 10 is a schematic diagram illustrating a configuration of a variation of the slip control device of the lock-up clutch illustrated in FIG. 7.

This variation is formed of combination of a slip control device illustrated in FIG. 7 and a slip control device provided with a controller illustrated in FIG. 9 in which a TC model 22a is replaced with an actual machine 22b of a torque converter 4 as illustrated in FIG. 10. In this variation, torque capacity Tlu of a lock-up clutch 5 output from the slip control device illustrated in FIG. 7 is added to an output of an integrator 21c provided in the controller illustrated in FIG. 9 to be input to the actual machine 22b of the torque converter 4.

Fourth Variation

Figure 11:
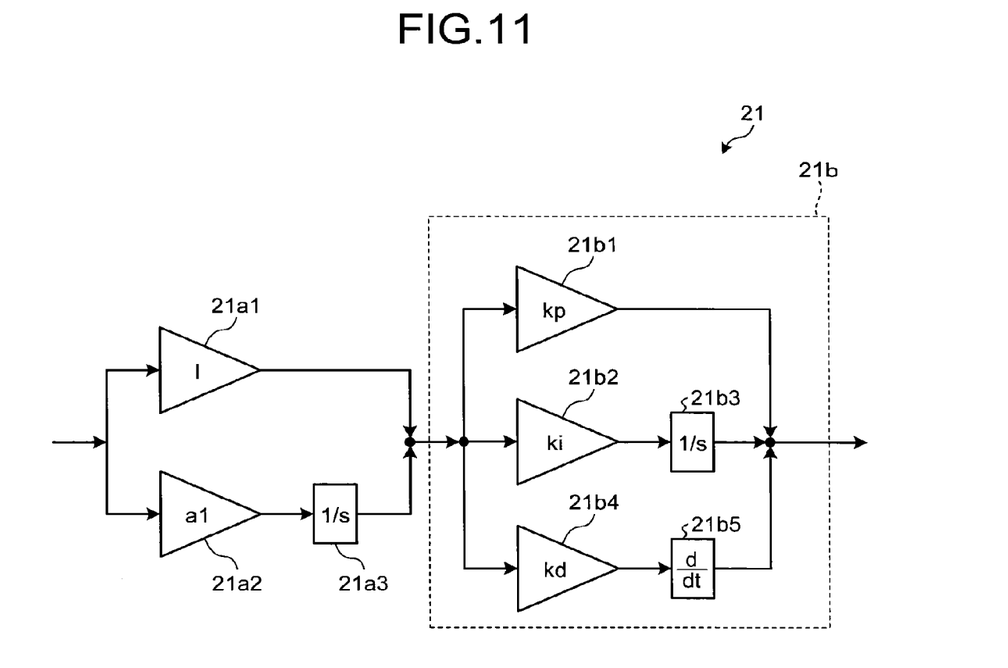
FIG. 11 is a schematic diagram illustrating a configuration of a variation of the controller illustrated in FIG. 8.

In this variation, a gain multiplying unit 21b calculates torque capacity Tlu of a lock-up clutch 5 by PID control as illustrated in FIG. 11. That is to say, the gain multiplying unit 21b is provided with multipliers 21b1 and 21b2, an integrator 21b3, a multiplier 21b4, and a differentiator 21b5.

The multiplier 21b1 multiplies a gain kp of proportional control (P control) by a sum of an output value of the multiplier 21a1 and an output value of the integrator 21a3 to perform proportional operation. The multiplier 21b2 multiplies a gain ki of integral control (I) by the sum of the output value of the multiplier 21a1 and the output value of the integrator 21a3. The integrator 21b3 calculates an integral value of the multiplied value of the multiplier 21b2. The multiplier 21b4 multiplies a gain kd of differential control (D) by the sum of the output value of the multiplier 21a1 and the output value of the integrator 21a3. The differentiator 21b5 calculates a temporal differential value of the multiplied value of the multiplier 21b4.

Meanwhile, although the torque capacity Tlu of the lock-up clutch 5 is calculated by the PID control in this variation, the control may be any one of the P control, I control, PI control, and PD control.

Hereinafter, a reason why the torque capacity Tlu of the lock-up clutch 5 may be controlled by common gains kp, ki, and kd without an effect of torque capacity of a torque converter 4 which non-linearly changes also in this variation is described with reference to equations.

In this variation, a controller K(s) is represented by following equation (29). Therefore, equation (8) described in the above-described embodiment is represented by following equation (30).

$$K(s) = \left(kp + ki \cdot \frac{1}{s} + kd \cdot s\right)(Is + a1) \cdot \frac{1}{s} \quad (29)$$

$$Is \cdot ne = \quad (30)$$

$$Te - F(ne, nt) + \left(kp + ki \cdot \frac{1}{s} + kd \cdot s\right)(Is + a1) \cdot \frac{1}{s} \cdot (nslp_{aim} - ne + nt)$$

Equation (31) is obtained by substituting equation (1) into equation (30), and equation (34) is obtained by arranging equation (31) in order of equations (32) and (33) and solving in terms of an estimated value of an engine speed ne.

$$Is \cdot ne = Te - (a1 \cdot ne + a2 \cdot nt - a1 \cdot ne_0 - a2 \cdot nt_0 + b1) + \quad (31)$$

$$\left(kp + ki \cdot \frac{1}{s} + kd \cdot s\right) \cdot (Is + a1) \cdot \frac{1}{s} \cdot (nslp_{aim} - ne + nt)$$

$$\left(Is + \left(kp + ki \cdot \frac{1}{s} + kd \cdot s\right)(Is + a1) \cdot \frac{1}{s} + a1\right) \cdot ne = \quad (32)$$

$$Te + \left(kp + ki \cdot \frac{1}{s} + kd \cdot s\right)(Is + a1) \cdot \frac{1}{s} \cdot nslp_{aim} +$$

$$\left(-a2 + \left(kp + ki \cdot \frac{1}{s} + kd \cdot s\right)(Is + a1) \cdot \frac{1}{s}\right) \cdot nt +$$

$$a1 \cdot ne_0 + a2 \cdot nt_0 - b1$$

$$\left(s + (kps + ki + kd \cdot s^2)\left(Is + \frac{a1}{s}\right) \cdot \frac{1}{s}\right) \cdot ne = \quad (33)$$

$$Te + (kps + ki + kd \cdot s^2)\left(1 + \frac{a1}{s}\right) \cdot \frac{1}{s} \cdot (nslp_{aim} + nt) -$$

$$a2 \cdot nt + a1 \cdot ne_0 + a2 \cdot nt_0 - b1$$

$$ne = \frac{(kp \cdot s + ki + kd \cdot s^2)}{(kd \cdot s^2 + (kp + 1) \cdot s + ki)}(nslp_{aim} + nt) + \quad (34)$$

$$\frac{1}{(kd \cdot s^2 + (kp + 1) \cdot s + ki)\left(1 + \frac{a1}{s}\right) \cdot \frac{1}{s}} \cdot$$

$$(Te - a2 \cdot nt + a1 \cdot ne_0 + a2 \cdot nt_0 - b1)$$

A first term of a right side of equation (34) indicates that the estimated value of the engine speed ne follows a target slip speed $nslp_{aim}$ at a constant rate $(kp*s+ki+kd*s^2)/(kd*s^2+(kp+1)*s+ki)$. That is to say, the response characteristic of the engine speed ne to the change in the target slip speed $nslp_{aim}$ is not affected by the fluctuation of the inclination a1 of the characteristic line L1. According to this, in this variation also, it is possible to calculate the torque capacity Tlu of the lock-up clutch 5 by the common gains kp, ki, and kd without the effect of the torque capacity which non-linearly changes. As a result, it is possible to optimally control the slip amount of the lock-up clutch 5 over an entire operating range by calculating the torque capacity Tlu of the lock-up clutch 5 by a simple configuration without the need of a lot of cost.

Example

In this example, responsiveness and convergence of a turbine speed are evaluated when a target slip speed $nslp_{aim}$ is changed from α [rpm] to 0 [rpm] by changing torque capacity Tlu of a lock-up clutch 5 in a case in which a non-linear characteristic of torque capacity of a torque converter 4 is not taken into consideration and a case in which the disclosure is used.

Figure 12A:
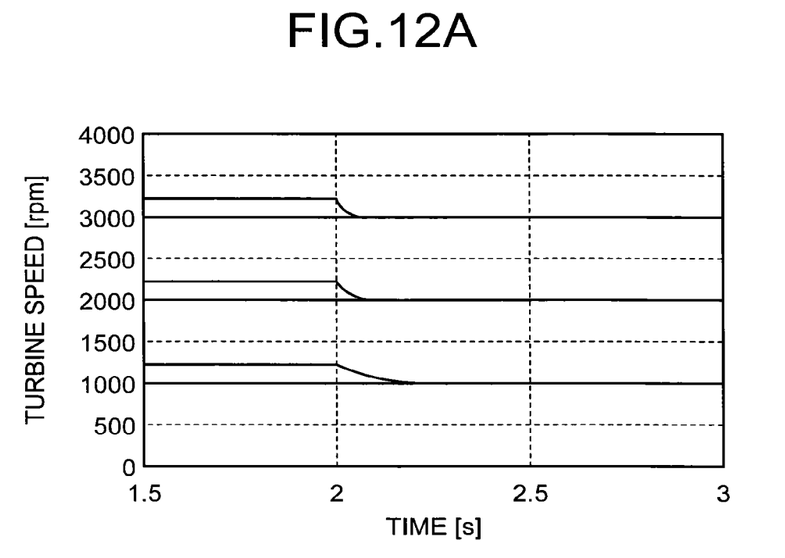
FIGS. 12A and 12B are views illustrating an evaluation result of responsiveness and convergence of a turbine speed when a non-linear characteristic of torque capacity of a torque converter is not taken into consideration.
Figure 12B:
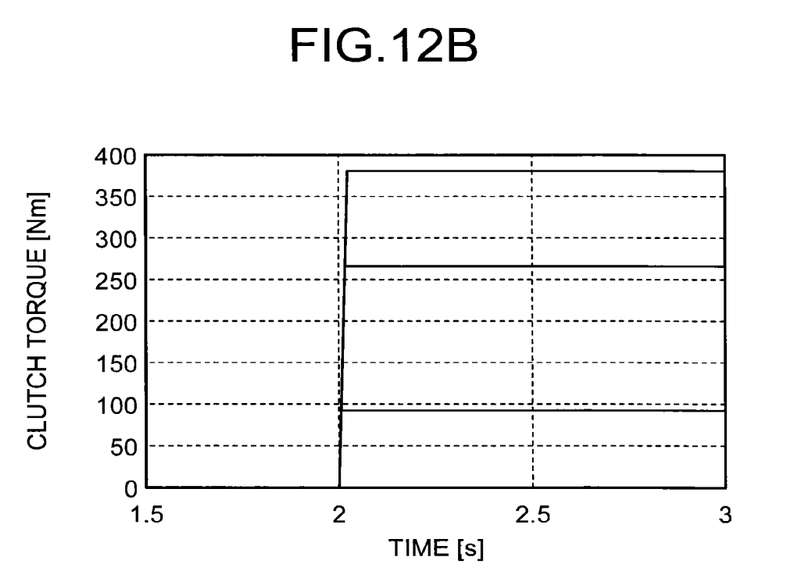

FIGS. 12A and 12B are views illustrating an evaluation result of the responsiveness and convergence of the turbine speed when the non-linear characteristic of the torque capacity of the torque converter 4 is not taken into consideration. When the non-linear characteristic of the torque capacity of the torque converter 4 is not taken into consideration, even when the torque capacity Tlu of the lock-up clutch 5 is changed in a stepwise manner as illustrated in FIG. 12B, the responsiveness and convergence of the turbine speed change according to the turbine speed at a time point at which the torque capacity Tlu of the lock-up clutch 5 is changed as illustrated in FIG. 12A.

Figure 13A:
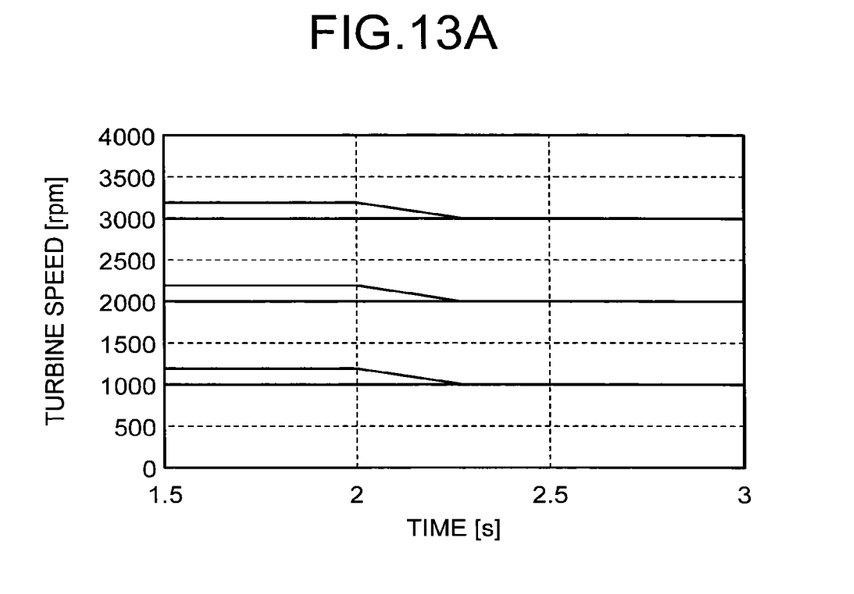
FIGS. 13A and 13B are views illustrating an evaluation result of the responsiveness and convergence of the turbine speed according to the disclosure is used.
Figure 13B:
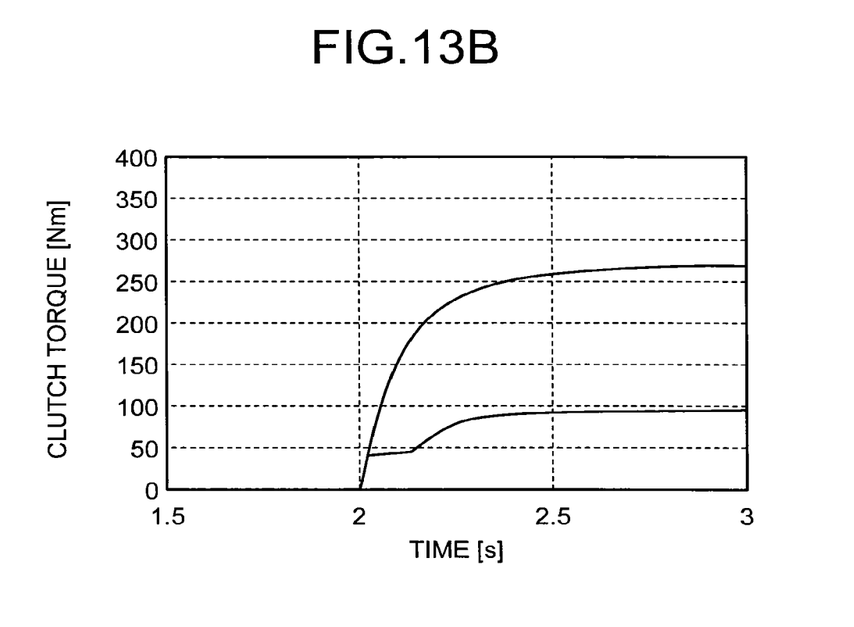

On the other hand, FIGS. 13A and 13B are views illustrating the evaluation result of the responsiveness and convergence of the turbine speed when the disclosure is used. When the disclosure is used, the torque capacity Tlu of the lock-up clutch 5 changes according to the turbine speed as illustrated in FIG. 13B. Therefore, the responsiveness and convergence of the turbine speed are the same regardless of the turbine speed at the time point at which the torque capacity Tlu of the lock-up clutch 5 is changed as illustrated in FIG. 13A.

From above, it is confirmed that it is possible to optimally control the slip amount of the lock-up clutch 5 over the entire operating range by calculating the torque capacity Tlu of the lock-up clutch 5 by the simple configuration without the need of a lot of cost and to improve the responsiveness and convergence of control of the slip amount of the lock-up clutch 5 according to the disclosure.

A slip control device of a lock-up clutch according to the disclosure calculates torque capacity of the lock-up clutch not by tuning a non-linear characteristic of a fluid type power transmitting device but by converting the non-linear characteristic of the fluid type power transmitting device to a linear characteristic, so that it is possible to optimally control a slip amount of the lock-up clutch over an entire operating range by calculating the torque capacity of the lock-up clutch by a simple configuration without the need of a lot of cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A slip control device adapted to be mounted on a vehicle including an engine, a transmission, a fluid type power transmitting device interposed between the engine and the transmission, and a lock-up clutch provided on the fluid type power transmitting device, the slip control device being configured to control a difference in rotational speed between an input shaft and an output shaft of the fluid type power transmitting device by controlling a slip amount of the lock-up clutch, the slip control device comprising
a control unit configured to:
calculate a difference value between a target value and a current value or an estimated value of the difference in the rotational speed between the input shaft and the output shaft of the fluid type power transmitting device, or a difference value between a target value and a current value or an estimated value of a speed of the engine;
calculate an inclination of torque capacity of the fluid type power transmitting device with respect to an input parameter at a current value of the input parameter having correlative relationship with the torque capacity of the fluid type power transmitting device;
calculate torque capacity of the lock-up clutch by multiplying the inclination by the difference value; and
control the slip amount of the lock-up clutch by using the calculated torque capacity.

2. The slip control device according to claim 1, wherein the control unit is configured to execute control in an operating range in which the torque capacity of the fluid type power transmitting device non-linearly changes with respect to the input parameter.

3. The slip control device according to claim 2, wherein the input parameter is any one of: the speed of the engine; the rotational speed of the output shaft of the fluid type power transmitting device; and the difference in the rotational speed between the input shaft and the output shaft of the fluid type power transmitting device.

4. The slip control device according to claim 1, wherein the input parameter is any one of: the speed of the engine; the rotational speed of the output shaft of the fluid type power transmitting device; and the difference in the rotational speed between the input shaft and the output shaft of the fluid type power transmitting device.

* * * * *